United States Patent Office 3,521,447
Patented July 21, 1970

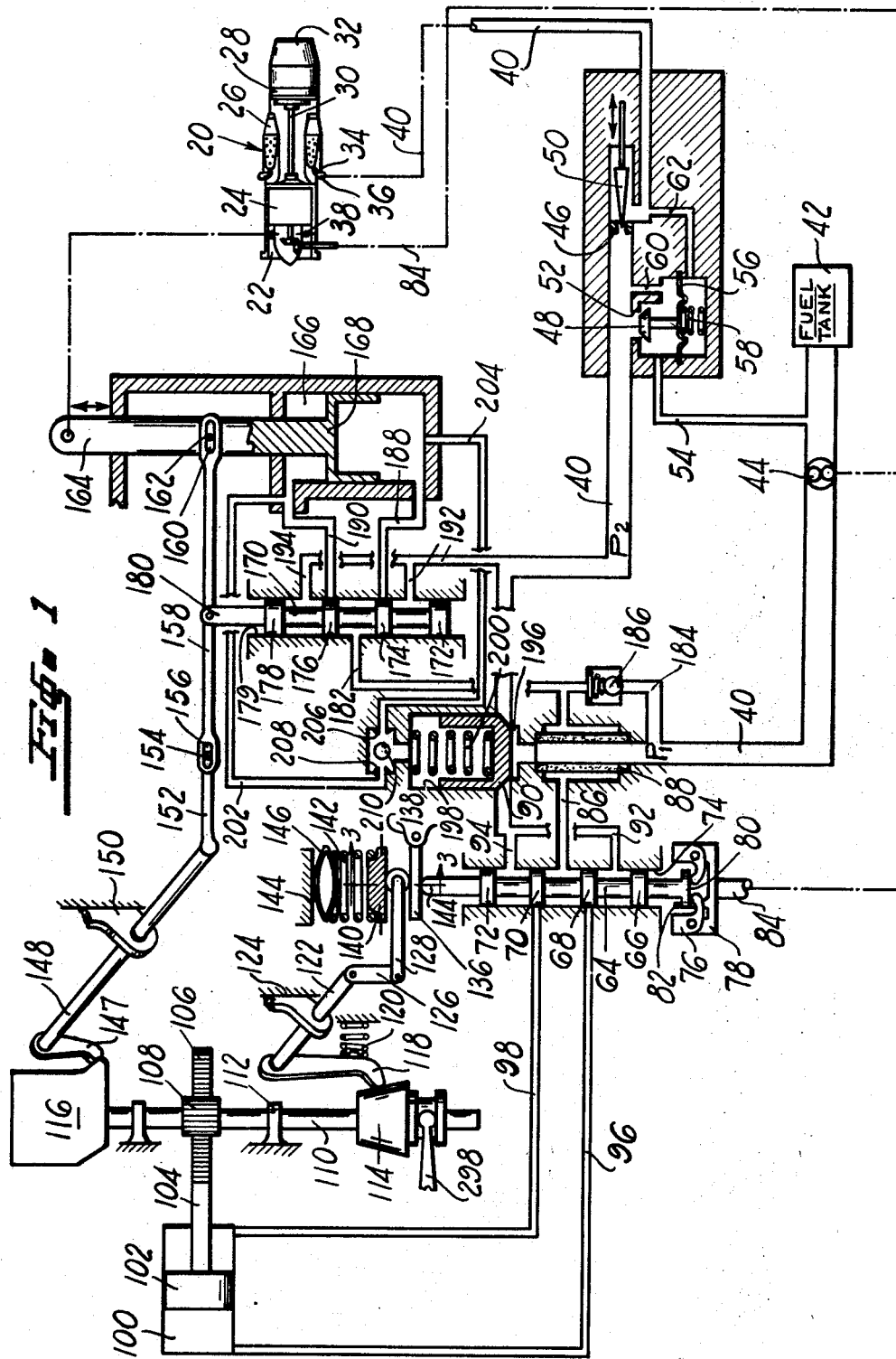

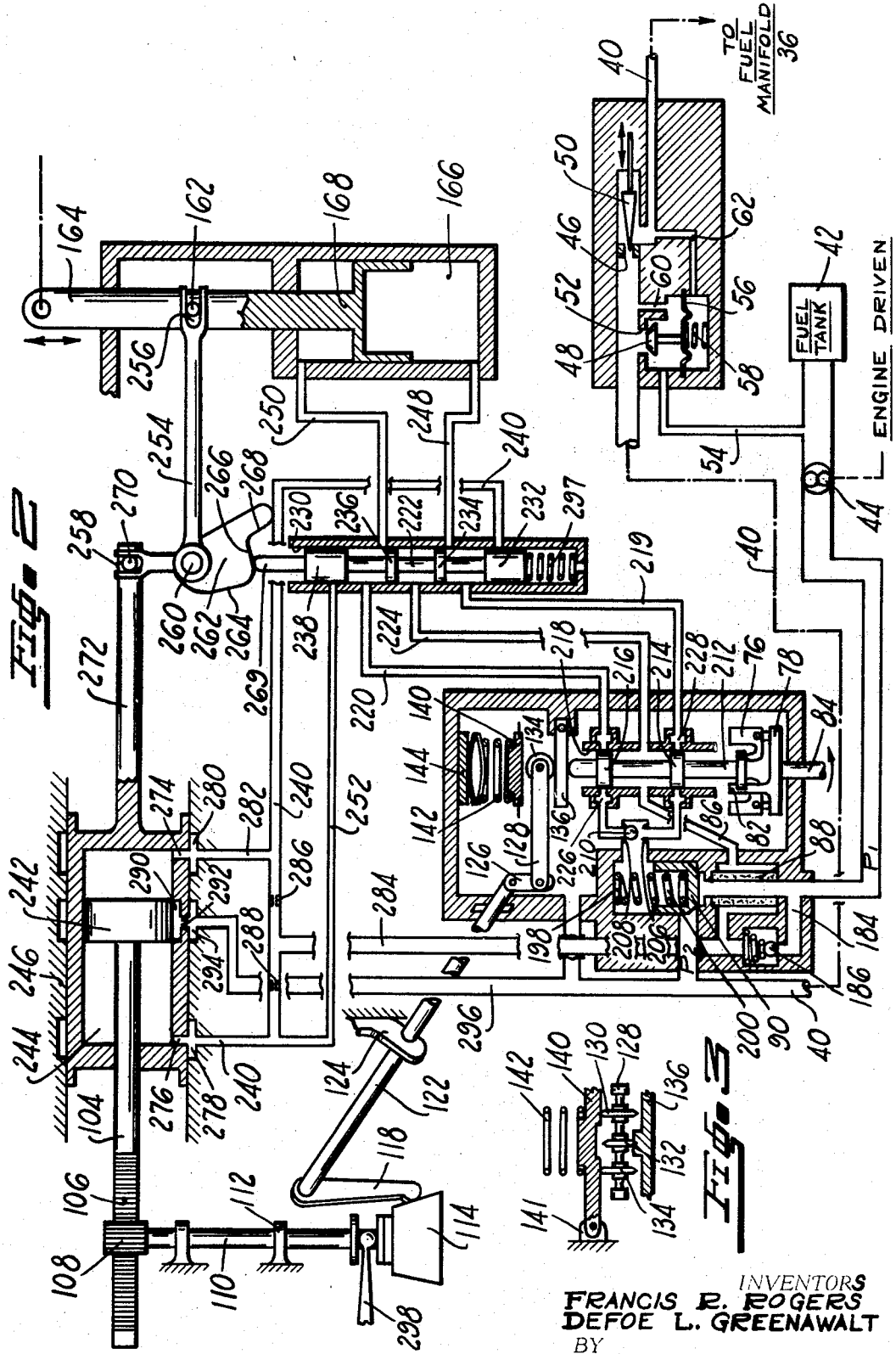

3,521,447
CASCADED FLUID FLOW CONTROL APPARATUS
Francis R. Rogers and De Foe L. Greenawalt, South Bend, Ind., assignors to The Bendix Corporation, a corporation of Delaware
Filed May 6, 1968, Ser. No. 726,798
Int. Cl. F02c 9/08, 9/14
U.S. Cl. 60—39.28                                15 Claims

ABSTRACT OF THE DISCLOSURE

Fluid flow control apparatus including a fluid conduit connected to receive pressurized fluid from a fluid pump and provided with fluid metering valve means therein for controlling the rate of flow therethrough to a fluid receiver having a predetermined maximum fluid flow rate requirement. A fluid operated servo is controlled by a servo valve connected to divert input pressurized fluid from the conduit upstream from the fluid metering valve means to the fluid operated servo and output pressurized fluid from the fluid operated servo to the conduit upstream from the fluid metering valve means to maintain the total output fluid flow of the pump available to the fluid metering valve means for metering purposes. A predetermined pressure differential between the servo fluid input and output is established by fluid pressure responsive fluid throttling means in series flow with the conduit upstream from the fluid metering valve means. The fluid throttling valve is pressure actuated toward a closed position in response to an increased load demand on the fluid operated servo to increase the input fluid pressure to the fluid operated servo and thus increase the predetermined pressure differential as necessary to effect movement of the fluid operated servo. In the abovementioned manner, the fluid pump total displacement is made available for load demand on the fluid operated servo with no adverse effect on metered fluid flow requirements thereby minimizing the required pump size and displacement thereof and power input thereto.

---

Our invention concerns fluid flow control mechanism and is particularly adapted to use in combustion engine fuel flow control systems having a fuel metering valve and one or more fuel operated servo devices which require a supply of pressurized fuel diverted thereto from a fuel pump supplying the entire fuel requirements of the system.

Conventional fuel control systems utilizing fluid fuel operated servo devices for actuating various positionable members such as cams, valves and, in the case of gas turbine engines, compressor inlet air guide vanes or exhaust nozzle gates are well known in the art. Reference is made to Pat. No. 3,103,785 issued Sept. 17, 1963, to H. J. Williams et al. (common assignee) for a typical example of such a conventional system. It has been a common practice to extract from fuel pump output flow the required pressurized fuel flow for input to the one or more servos and vent servo exhaust fuel and/or fuel in excess of servo control requirements to a relatively low pressure fuel source such as the inlet to the fuel pump. It will be recognized that such an arrangement wherein relatively high pressure fuel discharged by the fuel pump and used for servo control purposes undergoes a substantially large pressure drop in passage to the fuel pump inlet and resultant energy loss. Furthermore, the fuel pump capacity which generally dictates size and weight of the fuel pump must be selected to fulfill the fuel flow requirements of the fuel operated servo devices in addition to the predetermined maximum fuel flow requirement of the engine. Also, the increased fuel pump capacity necessitated by the servo means places a corresponding higher demand on power input to drive the fuel pump.

It is an object of our invention to provide fluid control apparatus having fluid metering means for producing a controlled fluid flow and fluid operated servo means connected to a common source of pressurized fluid wherein the fluid passing to the servo means is subsequently vented to the fluid metering means thereby maintaining the total output flow from the common source available for fluid metering purposes.

It is another object of our invention to provide a fluid control apparatus having fluid metering means for producing a controlled fluid flow and fluid operated servo means connected to a common source of pressurized fluid wherein the total output flow generated by the common source is available for fluid metering purposes irrespective of fluid flow demands of the servo means.

It is still another object of our invention to provide fluid control apparatus having fluid metering means for producing a controlled fluid flow and fluid operated servo means connected to a common source of pressurized fluid wherein the total output flow and thus pressure generated by the common source is available for energizing the servo means as well as for fluid metering purposes.

Other objects and advantages of our invention will be apparent to those skilled in the art with reference to the accompanying drawings wherein:

FIG. 1 is a schematic representation of a gas turbine engine and associated fuel control apparatus embodying the present invention;

FIG. 2 is a schematic representation of a gas turbine engine and associated fuel control apparatus embodying a modified form of the present invention;

FIG. 3 is a sectional view taken on line 3—3 of FIG. 1.

Referring to FIG. 1, numeral 20 designates a conventional gas turbine engine having an air inlet 22, an air compressor 24, a plurality of combustion chambers 26, a gas turbine 28 connected via a shaft 30 to the compressor 24, and an exhaust nozzle 32 arranged in series air flow relationship. A plurality of fuel injection nozzles 34 connected to a fuel manifold 36 are adapted to inject metered pressurized fuel into the combustion chambers 26 where the resulting air fuel mixture is burned to generate hot motive gas which passes through turbine 28 to drive compressor 24 and exhausts through nozzle 32 to the atmosphere to generate a propelling thrust. The air compressor 24 may be provided with conventional positionable air inlet guide vanes 38 suitably mounted to guide the air into the compressor as will be recognized by those persons skilled in the art.

A metered flow of pressurized fuel is supplied manifold 36 via conventional fuel metering apparatus including a fuel conduit 40 leading from a fuel tank 42 and provided with an engine driven fuel pump 44 which is shown as a positive displacement gear type having a capacity dependent upon the maximum metered fuel requirements of the engine. A fuel metering orifice 46 suitably located in conduit 40 downstream from pump 44 establishes the effective metering area of conduit 40 and together with a fuel by-pass valve 48 which maintains a predetermined constant fuel pressure differential across orifice 46 serves to regulate the quantity of fuel passing through conduit 40 to the engine.

A movable contoured valve member 50 suitably connected to orifice 46 and positioned relative thereto by suitable conventional actuating mechanism, not shown, in response to one or more variable conditions of engine operation as will be recognized by those persons skilled in the art serves to vary the effective flow area of orifice 46 according to the contour of valve 50 as a function of the one or more variable conditions of operation actuating the same.

The fuel by-pass valve 48 coacts with an orifice 52 connecting conduit 40 upstream from orifice 46 with a drain conduit 54 leading to conduit 40 upstream from pump 44 at relatively low pump inlet fuel pressure. A diaphragm 56 suitably connected to by-pass valve 48 is loaded by a compression spring 58 in a closing direction. A passage 60 communicates conduit 40 upstream from orifice 46 with one side of diaphragm 56 and a passage 62 communicates conduit 40 downstream from orifice 46 with the opposite side of diaphragm. The by-pass valve 48 operates to maintain a predetermined constant fuel pressure differential across orifice 46 depending upon the selected force of spring 58. Reference is made to said U.S. Pat. No. 3,103,785 for a fuel control having structure equivalent to the abovementioned variable area fuel metering valve and associated by-pass valve.

A spool valve 64 having spaced apart lands 66, 68, 70 and 72 is slidably carried for axial movement in a bore 74. A pair of centrifugal weights 76 pivotally secured to a rotatable table 78 bear against a flanged end 80 of valve member 64 and exert a force axially thereagainst tending to actuate valve member 64 upwardly as viewed in FIG. 1. The valve member 64 is preferably of the spinning type in which case an arm 82 integral with table 78 abuts the flanged end 80 thereby causing valve member 64 and table 78 to rotate in unison. The table 78 is rotatably driven by the compressor 24 via a conventional gear and shafting arrangement 84 thereby rendering the output force of centrifugal weights 76 the well known function of engine speed.

The annular space between lands 68 and 70 communicates via a conduit 86 and fuel filter 88 with conduit 40 at fuel pump discharge pressure $P_1$. The annular spaces between lands 66 and 68 and lands 70 and 72 communicate with conduit 40 downstream from a fuel pressurizing valve 90 via passages 92 and 94, respectively. In the null position shown, valve member 64 occupies a position whereby lands 68 and 70 block passages 96 and 98 leading to opposite ends of a chamber 100 in which a servo piston 102 is slidably carried. A shaft 104 integral with piston 102 extends therefrom through one end of chamber 100 and is provided with a rack 106 on the free end thereof. The rack 106 meshes with a spur gear 108 fixedly secured to a shaft 110 suitably mounted for rotation on fixed supports 112. Cam members 114 and 116 fixedly secured to opposite ends of shaft 110 are rotatable therewith in response to movement of servo piston 102. A cam follower 118 urged against cam 114 by a compression spring 120 is fixedly secured to one end of a shaft 122 rotatably mounted on fixed supports 124. The opposite end of shaft 122 is fixedly secured to one end of a lever 126 which, in turn, arm 128. A plurality of rollers 130, 132 and 134 (see FIG. 3) rotatably secured to an opposite yoked end of arm 128 are adapted to roll between a lever 136 pivotally secured to a fixed support 138 and a lever 140 pivotally mounted on a fixed support 141 loaded by a compression spring 142 interposed between a fixed retainer 144 and table 140. A temperature responsive capsule 146 which expands or contracts depending upon the change in environmental temperature may be interposed between retainer 144 and spring 142 to compensate for a changing environmental temperature effect on spring 142. The force of spring 142 is transmitted through rollers 130 and 134 which ride against lever 140 and roller 132 which rides against lever 136 to an extension 144 integral with valve member 64 and bearing against lever 136 thereby providing a feedback force in opposition to the force of centrifugal weights 76.

A follower 147 bearing against cam 116 is fixedly secured at one end of a shaft 148 rotatably mounted on fixed supports 150. A lever 152 fixedly secured at one end to the opposite end of shaft 148 is provided with a pin 154 on the opposite end thereof which rides in a slot 156 formed in one end of a lever 158. The opposite end of lever 158 is provided with a slot 160 which receives a pin 162 fixedly secured to a shaft 164 extending through one end of a chamber 166 and integral with a servo piston 168 slidably carried in chamber 166. A spool valve 170 having spaced apart lands 172, 174, 176 and 178 is slidably carried in a bore 179 and provided with an extension 180 pivotally secured to lever 158 intermediate slots 156 and 160.

The annular space between lands 174 and 176 communicates via a conduit 182 and filter 88 with conduit 40 at fuel pump discharge pressure $P_1$. A filter by-pass conduit 184 containing a spring loaded pressure relief valve 186 routes unfiltered fuel at pump discharge pressure around filter 88 in the event of a predetermined excessive pressure drop across the latter. In the null position shown of valve 170, the lands 174 and 176 block passages 188 and 190, respectively, leading to opposite ends of chamber 166. The annular spaces between lands 172 and 174 and lands 176 and 178 communicate with conduit 40 at fuel pressure $P_2$ downstream from pressurizing valve 90 via passage 192 and branch passage 194, respectively.

The pressurizing valve 90 coacts with an orifice 196 in conduit 40 downstream from filter 88 to regulate the effective flow area of conduit 40 and thus fuel pressure therein upstream from orifice 196 to maintain the supply fuel pressure $P_1$ to spool valve 170 at a predetermined normal value. To that end, the pressurizing valve 90 slidably carried in a chamber 198 is biased toward a closed position by a compression spring 200 interposed between valve 90 and one end of chamber 198 in opposition to the fuel at pump discharge pressure $P_1$ acting against the effective area of the end of valve 90 exposed thereto. The predetermined normal supply fuel pressure $P_1$ controlled by valve 90 may be automatically increased to a higher value to compensate for abnormal load conditions imposed on servo piston 168. To that end, the chamber 198 is vented to chamber 166 on opposite sides of servo piston 168 via passages 202 and 204 and associated spaced apart and aligned ball valve seats 206 and 208. A floating ball valve 210 suitably confined for movement relative to the valve seats 206 and 208 is unbalanced to fully open orifice 206 and close orifice 208 or the reverse depending upon the position of spool valve 170 and thus which side of servo piston 168 is vented to supply fuel pressure $P_1$. In the event the servo piston 168 demands an increased supply fuel pressure to overcome the load imposed on the piston 168 and effect feedback motion of valve 170 to its null position, the supply fuel pressure is transmitted from chamber 166 through the open orifice 206 or 208 to chamber 198 where it acts against valve 90 thereby augmenting the spring 200.

Assuming the engine to be stable in operation under given engine operating conditions, the above-described fuel control and associated fuel operated servo structure should occupy the positions shown in FIG. 1. In the event of an increase in engine speed, the output force of centrifugal weights will increase accordingly causing the spool valve 64 to move upwardly against the force exerted thereagainst by lever 136. The upward movement of lands 68 and 70 vents passages 96 and 98, respectively, to the annular spaces between lands 68 and 70 and lands 66 and 68, respectively. The resulting venting of passages 96 and 98 to supply fuel pressure $P_1$ upstream from pressurizing valve 90 and relatively lower fuel pressure $P_2$ downstream from pressurizing valve 90, respectively, produces a corresponding fuel differential across servo piston 102 which, in turn, moves to the left causing rotation of shaft 110 and thus cams 114 and 116 attached thereto as a function of engine speed. The follower 118 moves in response to a falling contour of cam 114 causing rollers 130, 132 and 134 to move away from the pivot axis of lever 136. The constant reference force exerted by spring 142 acts through the increasing effective lever arm of lever 136 to ultimately generate a feedback force against spool valve 64 sufficient to overcome the opposing force of centrifugal weights 76 and null spool valve 64 thereby stabilizing servo piston 102. It will be noted that the fuel displaced from chamber 100 via passage 96 as servo piston 102 moves, passes through the annular space between lands 66 and 68 to passage 92 which, in turn, vents to conduit 40 downstream of the pressurizing valve 90.

The follower 147 is actuated by cam 116 causing lever 152 to turn clockwise as viewed from the lever 152 end of shaft 148 which, in turn, causes lever 158 to pivot counterclockwise on pin 162 and displace spool valve 170 downward thereby venting passage 188 to supply fuel passage 182 via the annular space between lands 174 and 176 and venting passage 190 to exhaust passage 194 via the annular space between lands 176 and 178. The resulting fuel pressure differential generated across servo piston 168 drives the piston 168 and attached shaft 164 upward causing the inlet air guide vanes to move accordingly. The end of lever 158 attached to pin 162 is carried by shaft 164 causing the lever 158 to pivot counterclockwise on pin 154 and displace spool valve 170 upward to its null position thereby stabilizing servo piston 168. It will be noted that the fuel displaced from chamber 166 via passage 190 as servo piston 168 moves, passes through the annular space between lands 176 and 178 to passage 194 and 192 to conduit 40 downstream of the pressurizing valve 90.

The supply and exhaust fuel pressures on opposite sides of servo piston 168 are vented through passages 204 and 202, respectively, to ball valve 210 which is biased by the higher supply fuel pressure into sealing engagement with valve seat 208 thereby venting chamber 198 to passage 204 at supply fuel pressure.

In the event of inability of piston 168 to overcome the load imposed thereon, the spool valve 170 will remain in its off null position maintaining communication between passages 182 and 188 which results in a corresponding rise in supply fuel pressure to chamber 166 on the one side of piston 168 as well as in chamber 198 vented thereto. The pressure rise in chamber 198 is imposed against valve 90 and augments the spring 200 tending to urge valve 90 toward a closed position causing a corresponding rise in supply fuel pressure $P_1$ upstream therefrom and vented to piston 168 via passage 182, valve 170 and passage 188. If necessary, the pressurizing valve 90 will respond to the increasing supply fuel pressure to the extent of moving to a fully closed position causing the supply fuel pressure $P_1$ upstream from orifice 196 to rise to the maximum output pressure of pump 44 in an attempt to overcome the load imposed on piston 168 and return the spool valve 170 to its null position. It is unlikely that even unusually high load conditions imposed upon servo piston 168 would require such an extreme rise in servo fuel pressure in which case the pressurizing valve 90 can be expected to remain open to the extent that the fuel flow passing therethrough is adequate to meet the minimum fuel flow requirement of the engine.

A decrease in engine speed from the abovementioned assumed stable engine condition results in a reversal of the abovementioned sequence of events occurring during engine acceleration. Accordingly, spool valve 64 moves downward in response to decreasing output force of centrifugal weights 76 causing land 68 to vent passage 96 to passage 86 at supply fuel pressure $P_1$ and land 68 to vent passage 98 to passage 94 at relatively lower fuel pressure $P_2$ downstream from pressurizing valve 90. The resulting pressure differential across piston 102 drives piston 102 to the right thereby rotating cams 114 and 116 accordingly which, in turn, actuate followers 118 and 146, respectively. The rollers 130, 132 and 134 move towards the pivot axis of table 136 thereby reducing the effective lever arm thereof and feedback force applied against spool valve 64 to the extent of balancing the opposing force of centrifugal weights 76 whereupon spool valve 64 returns to the null position.

The follower 147 drives lever 152 in a counterclockwise direction thereby pivoting lever 158 about pin 162 in a clockwise direction causing spool valve 170 to move upward. The land 176 vents passage 190 to passage 182 at supply fuel pressure $P_1$ and land 174 vents passage 188 to passage 192 at relatively lower fuel pressure $P_2$ downstream from pressurizing valve 90. The resulting pressure differential across piston 168 drives the same downward thereby repositioning the compressor air inlet guide vanes 38 attached thereto. The lever 158 carried by shaft 164 follows piston 168 and pivots about pin 154 in a clockwise direction to actuate spool valve 170 downward to its null position where lands 174 and 176 block passages 188 and 190, respectively, to stabilize piston 168.

It will be noted that the exhaust flow from pistons 102 and 168 returns to conduit 40 downstream from pressurizing valve 90 thereby making the entire flow output of pump 44 available for fuel metering purposes.

Referring to FIG. 2 and the modified form of our invention, structure therein similar to that of FIG. 1 is identified by like numerals in the following description.

A spool valve 212 with spaced apart lands 214 and 216 is slidably carried in a cylinder 218. The valve 212 is actuated axially in response to the force output of centrifugal weights 76 and rotationally via arm 82 attached to table 78. In the null position shown of valve 212, lands 214 and 216 block communication between the annular space between lands 214 and 216 and passage 219 and 220, respectively, leading to a spool valve 222 which annular space is continuously pressurized with supply fuel via passage 86 leading from filter 88. A passage 224 leading to spool valve 222 is in constant communication with the annular space between lands 214 and 216. An annulus 226 surrounding cylinder 218 connects passage 220 with passage 204 leading to valve seat 206. An annulus 228 surrounding cylinder 218 connects passage 219 with passage 190 leading to valve seat 208.

Spool valve 222 is slidably carried in a cylinder 230 and provided with spaced apart lands 232, 234, 236 and 238. The land 232 controls communication between a passage 240 and the annular space between lands 232 and 234 which annular space is in continuous communication with passage 219. The passage 240 leads to one side of a servo piston 242 slidably carried in a cylinder 244 which, in turn, is slidably carried in a housing 246. The land 234 controls communication between a passage 248 and the annular space between lands 232 and 234 or the annular space between lands 234 and 236 depending upon the position of land 234 relative to the passage 248 which communicates with chamber 166 on one side of servo piston 168. The annular space between lands 234 and 236 is in continuous communication with passage 224. The land 236 controls communication between a passage 250 and the annular space between lands 236 and 238 or the annular space between land 234 and 236 depending upon the position of land 236 relative to the passage 250 which communicates with chamber 166 on the opposite side of servo piston 168. The annular space between lands 236 and 238 is in continuous communication with passage 220. The land 238 controls communication between the annular space between lands 236 and 238 and a passage 252 connected to passage 240.

A lever 254 having slotted ends 256 and 258 is pivotally mounted on a fixed support 260 and provided with a cam member 262 secured thereto. The cam member 262 is contoured to provide three cam surface portions 264, 266 and 268 which control the position of a follower 269 engageable therewith and integral with spool valve 232. The slotted ends 256 and 258 receive pin 162 attached to shaft 164 and a pin 270 attached to an arm 272 integral with cylinder 244, respectively, through which the cylinder 244 is positioned in response to movement of servo piston 168. The cylinder 244 is provided with spaced apart ports 274 and 276 between which the servo piston 242 slides. The housing 246 is provided with an annulus 278 communicating port 276 with passage 240 and an annulus 280 communicating port 274 with a passage 282 leading to passage 240. Filtered pressurized fuel is communicated from filter 88 to passage 240 via passage 284 which connects to passage 240 intermediate fixed restrictions 286 and 288 having equal flow areas.

The servo piston 242 is slidable relative to a port 290 formed in cylinder 244 and provided with a width equivalent to the axial width of piston 242. The port 290 communicates through a restriction 292 carried by cylinder 244 with an annulus 294 in housing 246 which annulus 244, in turn, communicates with a passage 296 leading to fuel conduit 40 at fuel pressure $P_2$ downstream from pressurizing valve 90.

The mechanism of FIG. 2 has the desirable characteristics of FIG. 1 and produces an additional control feature which permits actuation of the compressor air inlet guide vanes over only a selected portion of the range of operating speeds of the engine.

Assuming the engine to be stable in operation under given engine operating conditions including an engine speed within a predetermined intermediate operating range of speeds of the engine, the structure of FIG. 2 will occupy the positions shown wherein the spool valve 212 is at a null position with lands 214 and 216 thereof blocking passages 219 and 220, respectively. Supply fuel is transmitted from filter 88 to the annular space between lands 234 and 236 via passage 86, annular space between lands 214 and 216, and passage 224. The supply fuel is trapped in the annular space between lands 234 and 236 thereby isolating supply fuel flow from passages 248 and 250. The lower side of piston 168 is vented to the backside of pressurizing valve 90 via passage 248, annular space between lands 232 and 234, passage 248, annulus 228, passage 206, valve seat 208 and chamber 198 whereas the upper side of piston 168 is vented to valve seat 206 via passage 250, annular space between lands 236 and 238, passage 220, annulus 226 and passage 204. The ball valve 210 is biased against valve seat 206 in response to the higher pressure fuel in chamber 198 thereby maintaining the pressure differential across piston 168 to stabilize the same.

The servo piston 242 is held in a fixed piston relative to cylinder 244 by virtue of the blocking of passages 240 and 252 by lands 232 and 238, respectively. Supply fuel passes through passage 284 to passage 240 which, in turn, directs the supply fuel through restrictions 286 and 288 to the right side of piston 242 and passage 282 leading to the left side of piston, respectively, thereby equalizing fuel pressures on opposite sides of piston 240 to fix the position thereof in overlapping engagement with port 290. Any movement of piston 242 from its position overlapping port 290 for the fixed position of cylinder 244 results in venting of one side or the other of piston 242 depending upon the movement thereof relative to port 290 which communicates via restriction 292 and passage 296 with relatively lower fuel pressure $P_2$ in conduit 40 downstream from pressurizing valve 90. The resulting drop in fuel pressure against the one side of piston 242 causes the piston 242 to move in a direction to overlap port 290 thereby re-establishing equal fuel pressures on opposite sides of the source.

Now, assuming a decrease in engine speed and a corresponding drop in output force of centrifugal weights 76, the spool valve 212 is urged downward off the null position communicating passage 219 as well as passage 224 with the supply fuel passage 86 and communicating passage 220 with relatively lower fuel pressure $P_2$ in conduit 40 downstream from pressurizing valve 90. The supply fuel passes to the lower side of piston 168 via passage 219, annular space between lands 232 and 234 and passage 248 thereby urging piston 168 upward causing fuel on the opposite side thereof to exhaust to passage 220 via passage 250 and the annular space between lands 236 and 238. The lever 254 actuated by piston 168 moves accordingly causing counterclockwise movement of cam 262 and movement of cyinder 244 toward the left as viewed in FIG. 2. The piston 242 is held in a fixed position relative to cylinder 244 in the heretofore mentioned manner and moves with cylinder 244 causing gear 108 and cam 144 to rotate accordingly which, in turn, provides feedback motion to follower 118 and subsequent movement of rollers 130, 132 and 134 toward the pivot axis of lever 136 thereby decreasing the effective lever arm of lever 136 and thus the force applied against spool valve 212 in opposition to the centrifugal weights 76.

The portion 266 of cam 262 is provided with a constant radius which results in spool valve 222 remaining stationary as the cam 262 rotates. As engine speed continues to decrease reducing the force output of centrifugal weights 76 thereby holding spool valve 212 in its off null position, the servo piston 168 is pressurized accordingly in the heretofore mentioned manner in an upward direction causing corresponding movement of cam 262 and cylinder 244. As the piston 168 approaches the end of chamber 166 in response to a predetermined engine speed, the cam 262 rotates to a position whereby follower 269 drops off cam portion 266 and rides against cam portion 264 causing spool valve 22 to move upward in response to spring 297 bearing against the end thereof to a position where land 238 communicates passage 252 with the annular space between lands 236 and 238 which, in turn, is vented to passage 220 at relatively low fuel pressure $P_2$. It will be noted that the cam portion 264 is contoured to provide a slight cam fall in the clockwise direction of movement of cam 262 in the event that piston 168 attempts to move beyond the predetermined position corresponding to that at which the cam portion 264 becomes engaged with follower 269. If the load imposed on piston 168 should vary allowing the same to move upward, the decreasing effective radius of cam portion 264 permits follower 269 to move upward thereby causing land 236 to vent passage 250 to supply fuel in the annular space between lands 234 and 236 thereby pressurizing the upper side of piston 168 to the extent necessary to overcome the opposing force on piston 168.

As engine speed continues to decrease below the predetermined speed at which follower 269 becomes engaged with cam portion 264, the servo piston 168 and attached lever 254, cam 262 and cylinder 244 remain stationary. The fuel pressure acting against the left hand side of piston 242 is vented to relatively low fuel pressure $P_2$ via passage 240, passage 252, the annulus between lands 236 and 238 and passage 220 causing piston 242 to move to the left relative to fixed cylinder 244 in response to the higher supply fuel pressure acting against the right hand side of piston 242. It will be noted that the passage 240 downstream from restriction 286 is blocked by land 232 thereby causing the supply fuel passing through restriction 286 to pass through passage 282 to piston 242. As piston 242 moves relative to port 290, the right side of piston 242 is vented to relatively lower fuel pressure in passage 296 via port 290 and restriction 292. Since the restrictions 286 and 292 have equal flow areas, the fuel pressure intermediate the restrictions 286 and 292 and acting against piston 242 is equivalent to one-half of the total pressure drop across both restrictions 286 and 292 which provides for adequate pressurization of piston 242.

Assuming the engine deceleration terminates whereupon the engine speed and thus output force of centrifugal weights 76 stabilize accordingly, the spool valve 212 is nulled in response to the equal and opposite feedback force imposed on spool valve 212. In the null position of spool valve 212, the lands 214 and 216 thereof isolate passages 219 and 220 from supply fuel passage 86 and the relatively lower fuel pressure $P_2$ downstream from pressurizing valve 90, respectively, which results in stabilization of servo piston 242.

If, instead of the above described engine deceleration, an engine acceleration occurs from the same initial engine speed setting as reperesented by the position of the structrual elements in FIG. 2, a reversal of the above described sequence of events will occur. Accordingly, the spool valve 212 will be displaced upward from its null position allowing passages 220 and 224 to be vented to passage 86 at supply fuel pressure and passage 219 to the relatively lower fuel pressure $P_2$ downstream from pressurizing valve 90. The servo piston 168 being pressurized downwardly accordingly as engine speed increases will rotate cam 262 clockwise and displace cylinder 244 with piston 242 fixed in position therein by virtue of the aforementioned equalization of fuel pressures thereacross. Upon reaching a predetermined engine speed, the piston 168 reaches a position approaching the lower end of chamber 166 thereby rotating cam 262 to a position where follower 269 engages cam portion 268 resulting in spool valve 222 moving downwardly against spring 297 causing land 234 to overlap passage 248 and land 232 to vent passage 240 to passage 219 at relatively low fuel pressure $P_2$ downstream from pressurizing valve 90. The servo piston 168 being stabilized holds cam 262 and cylinder 244 stationary. The right side of servo piston 242 is depressurized by the venting of passage 240 downstream from restriction 286 to passage 219 at pressure $P_2$ permitting piston 242 to move to the right relative to port 290. The piston 242 will continue to move rightward thereby positioning feedback cam 114 as a function of existing engine speed until the feedback force generated against spool valve 212 balances the force of centrifugal weights 76 whereupon the spool valve 212 becomes nulled thereby stabilizing piston 242 accordingly.

The cam portion 268 presents an increasing effective radius in the clockwise direction of rotation thereof such that the spool valve 222 is urged downwardly in the event that servo piston 168 attempts to overtravel into engagement with the end of chamber 166 for any reason such as a variation in the load imposed thereon. The downward movement of spool valve 222 will permit the trailing edge of land 234 to vent passage 248 to the annular space between lands 234 and 236 at supply fuel pressure $P_1$ which, in turn, pressurizes the lower side of piston 168 to oppose the downward movement thereof and urge the same back to its proper position in spaced apart relationship with the adjacent end of chamber 166.

As in the case of FIG. 1 heretofore described the ball valve 210 is actuated into sealed engagement with valve seat 206 or 208 depending upon which side of piston 168 is pressurized to the greatest extent thereby exposing chamber 198 and thus the spring side of pressurizing valve 90 to the same fuel pressure as that exerted against piston 168 to drive the same. Failure of piston 168 to move in response to the normal fuel pressure differential generated thereacross results in closing movement of pressurizing valve 90 to cause an increase in supply fuel pressure upstream therefrom to the maximum pump discharge pressure, if necessary, to overcome the load imposed upon piston 168.

It may be desired to make the position of the servo piston 102 of FIG. 1 or piston 242 of FIG. 2 as well as the position of servo piston 168 controlled thereby a function of an additional engine operating condition. To that extent, the feedback cam 114 may be a three-dimensional cam contoured radially as a function of engine speed and axially as a function of compressor inlet air temperature. The cam 114 may be suitably connected by means including lever 298 and temperature actuated mechanism, not shown, responsive to compressor inlet air temperature. In this manner the position of the inlet air guide vanes 38 may be made a function of engine speed corrected for compressor inlet air temperature.

We claim:
1. Fluid flow control apparatus comprising:
a source of pressurized fluid;
a fluid receiver;
a conduit connecting said source with said receiver;
fluid control means operatively connected to said conduit for controlling fluid flow therethrough to said receiver;
fluid operated servo means connected to actuate a movable member;
a servo fluid inlet connected to said conduit for diverting pressurized fluid from said conduit to said fluid operated servo means to energize the same;
a servo fluid outlet connected to said conduit for returning fluid from said fluid operated servo means to said conduit;
valve means in said conduit between said servo fluid inlet and outlet for generating a fluid pressure differential therebetween; and
means responsive to the force load imposed on said fluid operated servo means operatively connected to said servo means and said valve means for controlling said valve means to increase said fluid pressure differential in response to an increase in said force load;
said conduit supplying the entire output flow from said source to said fluid control means irrespective of the fluid flow demand of said fluid operated servo means.

2. Fluid flow control apparatus as claimed in claim 1 wherein:
said fluid operated servo means includes servo fluid pressure actuated means connected to actuate the movable member; and
said force responsive means includes fluid pressure responsive means operatively connected to said valve means and responsive to the servo fluid pressure acting against said servo fluid pressure actuated means for imposing a force against said valve means which force varies as a function of the force load imposed on said fluid pressure actuated means;
said valve means being operative to obstruct flow through said conduit in response to an increase in said force directed thereagainst to effect a corresponding increase in said fluid pressure differential to the extent necesary to overcome the force load imposed against said fluid pressure actuated means.

3. Fluid flow control apparatus as claimed in claim 2 wherein:
said source of pressurized fluid is the output from a positive displacement fluid pump.

4. Fluid flow control apparatus as claimed in claim 1 wherein:
said valve means includes a fluid throttling valve in said conduit between said servo fluid inlet and outlet for controlling fluid flow through said conduit to generate a fluid pressure differential between said servo fluid inlet and outlet.

5. Fluid flow control apparatus as claimed in claim 1 wherein said fluid operated servo means includes:
a servo fluid pressure responsive member connected to actuate the movable member;
passage means providing fluid connections between said servo fluid inlet and said fluid pressure responsive member and said servo fluid outlet and said fluid pressure responsive member;
servo valve means operatively connected to said passage means for controlling fluid flow through said passage means to energize said fluid pressure responsive member; and
control means operatively connected to said servo valve means for actuating the same.

6. Fluid flow control apparatus as claimed in claim 1 wherein:
said servo fluid inlet and outlet are connected to said conduit upstream from said fluid control means.

7. Fluid flow control apparatus as claimed in claim 1 and adapted for use in controlling fuel flow to a combustion engine wherein:
said source of pressurized fluids is fuel pressurized by an engine driven fuel pump;
said fluid receiver is the combustion engine connected to receive pressurized fuel from said pump; and
said fluid control means includes variable area fuel metering valve means in flow controlling relationship with the pressurized fuel output from said pump.

8. Fluid flow control apparatus as claimed in claim 7 wherein:
said fluid operated servo means includes a pressurized fuel responsive member connected to actuate said movable member and a servo valve operatively connected to said servo inlet for controlling fuel flow therefrom to said pressurized fuel responsive member;
engine speed responsive means operatively connected to said servo valve for imposing an actuating force thereagainst which varies as a function of engine speed; and
position feedback means operatively connecting said pressurized fuel responsive member and said servo valve for imposing a feedback force against said servo valve in opposition to said engine speed generated force.

9. Fluid flow control apparatus as claimed in claim 1 wherein:
said fluid operated servo means includes at least one fluid pressure differential responsive member having opposite sides;
first passage means communicating with one of said opposite sides;
second passage means communicating with the other of said opposite sides;
third passage means communicating with said servo fluid inlet;
fourth passage means communicating with said servo fluid outlet;
servo valve means operatively connected to said first, second, third and fourth passage means for simultaneously venting one of said first and second passages to said third passage means and the other of said first and second passage means to said fourth passage means to generate a fluid pressure differential across said member;
pressurizing valve means in said conduit intermediate said servo fluid inlet and outlet for controlling fluid flow through said conduit and thus the fluid pressure at said servo fluid inlet;
fluid pressure responsive means operatively connected to said pressurizing valve means for actuating the same;
fifth passage means communicating said first passage means with said fluid pressure responsive means;
sixth passage means communicating said second passage means with said fluid pressure responsive means; and
valve means operatively connected to said fifth and sixth passage means and responsive to the fluid pressure differential therebetween for blocking one of said fifth and sixth passages and opening the other of said fifth and sixth passages to vent the higher pressure fluid to said fluid pressure responsive means.

10. Fluid flow control apparatus as claimed in claim 9 wherein:
said pressurizing valve means is pre-loaded in a closing direction by resilient means operatively connected thereto;
said pressurizing valve means being operative in response to said pre-load to establish a corresponding normal fluid pressure in said conduit upstream therefrom;
said pressurizing valve means being responsive to said fluid pressure responsive means connected thereto and actuated thereby to augment said resilient means and cause a corresponding increase in said fluid pressure in said conduit upstream therefrom in excess of said normal fluid pressure.

11. Fluid flow control apparatus as claimed in claim 1 wherein:
said fluid operated servo means includes a first fluid pressure responsive member connected to actuate said movable member;
a second fluid pressure responsive member;
conduit means providing fluid communication between said first and second pressure responsive members and said servo fluid inlet and outlet;
first valve means operatively connected to said conduit means for controlling fluid flow therethrough;
actuating means operatively connected to said first valve means for actuating the same in response to a variable input signal to control said first fluid pressure responsive member as a function of said variable input signal;
feedback means operatively connecting said first valve means to said first and second fluid pressure responsive members for controlling the effect of said actuating means on said first valve means;
second valve means operatively connected to said conduit means for controlling fluid flow therethrough to render said first fluid pressure responsive member irrespective over a predetermined range of said variable input signal and said second fluid pressure responsive member operative over the remaining range of said variable input signal; and
means operatively connecting said first fluid pressure responsive member and said second valve means for actuating said valve means to render said first pressure responsive member inoperative and said second pressure responsive member operative.

12. Fluid flow control apparatus as claimed in claim 11 wherein:
said feedback means includes a movable cylinder operatively connected to said first fluid pressure responsive member and actuated thereby;
said second fluid pressure responsive member being slidably carried in said cylinder and operatively connected to said first valve means; and
said means operatively connecting said first fluid pressure responsive member and said second valve means including a cam member operative to control the position of said second valve means in a response to the position of said first fluid pressure responsive member.

13. Fluid flow control apparatus as claimed in claim 12 wherein:
said feedback means further includes force producing means;
force transmitting means operatively connecting said force producing means and said first valve means for imposing a force against said first valve means in opposition to said activating means; and
linkage means operatively connecting said force transmitting means to said second fluid pressure responsive member.

14. Fluid flow control apparatus as claimed in claim 12 wherein:
said first and second fluid pressure responsive members are fluid pressure differential responsive;
said conduit means includes first restricted passage means operatively connecting said servo fluid inlet to one side of said second fluid pressure differential responsive member;
second restricted passage means operatively connecting said servo fluid inlet to the opposite side of said second fluid pressure differential responsive member;

a first branch passage connected to first passage means downstream from the restricted portion thereof;

a second branch passage connected to said second passage means downstream from the restricted portion thereof;

said second valve means being operatively connected to said first and second branch passage and adapted to block the same to equalize the fluid pressures on opposite sides of said second fluid pressure differential responsive member and fix the position thereof relative to said movable cylinder over a first contoured portion of said cam member corresponding to said predetermined range of variable input signal.

15. Fluid flow control apparatus as claimed in claim 14 wherein:

said second valve means is operative in response to a second contoured portion of said cam to vent one of said first and second branch passages to said servo fluid outlet to generate a fluid pressure differential across said second fluid pressure differential responsive member and actuate the same relative to said cylinder.

References Cited
UNITED STATES PATENTS

| | | | |
|---|---|---|---|
| 2,354,634 | 7/1944 | Griswold | 60—53 X |
| 2,851,856 | 9/1958 | Harris et al. | 60—39.28 |
| 2,855,029 | 10/1958 | Eastman | 60—39.28 X |
| 2,924,070 | 2/1960 | Eastman | 60—39.28 |
| 3,005,464 | 10/1961 | Huckins | 60—39.28 XR |
| 3,074,472 | 1/1963 | Williams | 60—39.28 |

CARLTON R. CROYLE, Primary Examiner

U.S. Cl. X.R.

60—52, 39.27; 137—34